(12) United States Patent
Garrabrant

(10) Patent No.: US 9,188,373 B2
(45) Date of Patent: Nov. 17, 2015

(54) GAS-FIRED HEAT PUMP WATER HEATER

(75) Inventor: Michael A. Garrabrant, Unicoi, TN (US)

(73) Assignee: Stone Mountain Technologies, Inc., Johnson City, TN (US)

( * ) Notice: Subject to any disclaimer, the term of this patent is extended or adjusted under 35 U.S.C. 154(b) by 1046 days.

(21) Appl. No.: 12/776,839

(22) Filed: May 10, 2010

(65) Prior Publication Data

US 2010/0281899 A1   Nov. 11, 2010

Related U.S. Application Data

(60) Provisional application No. 61/176,526, filed on May 8, 2009.

(51) Int. Cl.
*F25B 27/00* (2006.01)
*F25B 30/04* (2006.01)
*F24D 12/02* (2006.01)
(Continued)

(52) U.S. Cl.
CPC ............. *F25B 30/04* (2013.01); *F24D 12/02* (2013.01); *F24D 17/0036* (2013.01); *F24D 17/02* (2013.01); *F24H 1/205* (2013.01); *F24H 4/04* (2013.01); *F24H 8/00* (2013.01); *F24D 2200/18* (2013.01); *Y02B 10/20* (2013.01);
(Continued)

(58) Field of Classification Search
CPC ........... F25B 30/04; F24D 17/02; F24H 4/04; F24H 8/00; F24H 1/205; F24H 9/2035
USPC ........ 62/238.3, 238.6, 238.7, 476; 126/350.1, 126/360.1, 31; 122/13.01, 18.3, 155.1
See application file for complete search history.

(56) References Cited

U.S. PATENT DOCUMENTS 2,516,094 A * 7/1950 Ruff .............................. 62/238.6
2,990,694 A * 7/1961 Kummerlowe et al. ..... 62/238.3
(Continued)

FOREIGN PATENT DOCUMENTS

| JP | 2006073416 | 3/2006 |
|---|---|---|
| NL | 8200030 | 8/1983 |
| WO | 2009026618 | 3/2009 |

OTHER PUBLICATIONS

Khemani, H., Advantages and Disadvantage of Absorption Refrigeration over Vapor Compression Refrigeration System, updated Mar. 17, 2010, retreived from http://www.brighthubengineering.com/hvac/66476-absoprtion-refrigeration-vs-vapor-compression-refrigeration-system/ on Apr. 12, 2014.*

(Continued)

*Primary Examiner* — Cheryl J Tyler
*Assistant Examiner* — Orlando E Aviles Bosques
(74) *Attorney, Agent, or Firm* — Jason H. Foster; Kremblas & Foster

(57) ABSTRACT

A heat activated (preferably natural gas, propane, solar or waste heat fired) absorption heat pump water heater and heat exchange system. The heat driven absorption heat pump system extracts low grade heat from the ambient air and produces high grade heat suitable for heating water for domestic, climate control or process purposes in a storage tank. Flue gases exiting the absorption heat pump system are further cooled by the heated water to enable high (condensing) combustion efficiencies. The heat activated heat pump water heating system achieves COP of 1.5 or greater.

10 Claims, 12 Drawing Sheets

(51) Int. Cl.
*F24D 17/00* (2006.01)
*F24D 17/02* (2006.01)
*F24H 1/20* (2006.01)
*F24H 4/04* (2006.01)
*F24H 8/00* (2006.01)

(52) U.S. Cl.
CPC .............. *Y02B 10/70* (2013.01); *Y02B 30/102* (2013.01); *Y02B 30/14* (2013.01); *Y02B 30/52* (2013.01)

(56) References Cited

U.S. PATENT DOCUMENTS

| | | | |
|---|---|---|---|
| 4,364,239 A * | 12/1982 | Chapelle et al. | 62/238.6 |
| 4,819,444 A * | 4/1989 | Meckler | 62/238.6 |
| 5,272,891 A * | 12/1993 | Erickson | 62/477 |
| 5,339,654 A | 8/1994 | Cook et al. | |
| 5,617,737 A | 4/1997 | Christensen et al. | |
| 5,704,417 A * | 1/1998 | Christensen et al. | 165/110 |
| 5,946,927 A | 9/1999 | Dieckmann et al. | |
| 6,233,958 B1 | 5/2001 | Mei et al. | |
| 6,314,752 B1 | 11/2001 | Christensen et al. | |
| 7,171,824 B2 | 2/2007 | Guerra | |
| 7,347,057 B1 | 3/2008 | Garrabrant et al. | |
| 2003/0000213 A1 * | 1/2003 | Christensen et al. | 60/670 |
| 2005/0235984 A1 | 10/2005 | Trihey et al. | |
| 2007/0039341 A1 * | 2/2007 | Gordon et al. | 62/238.6 |

OTHER PUBLICATIONS

Erickson, Donald C., et al.; Thermally-Activated Chiller/Heat Pump; International Congress of Refrigeration—2003, Washington, D.C.; pp. 1-6.

Fulton Heating Solutions, Inc.; Invictus Gas Fired Absorption Heat Pump Systems; Brochure; 2009—1215.

* cited by examiner

Possible Flue Gas Paths      B = Burner

GAS-FIRED HEAT PUMP WATER HEATER

CROSS-REFERENCE TO RELATED APPLICATION

This application claims the benefit of U.S. Provisional Application No. 61/176,526 filed May 8, 2009. This prior application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

Heat activated absorption cycles, using a wide variety of working fluids, have been utilized to provide cooling, refrigeration, and heating for many years. Absorption cycles utilize heat energy as the primary energy source, instead of mechanical work (most commonly using electric motors) utilized by vapor-compression heat pump cycles. The most common working fluids for absorption cycles are ammonia-water ($NH_3$—$H_2O$) and lithium bromide-water ($LiBr$—$H_2O$), although there are many other suitable combinations. Since water is used as the refrigerant for $LiBr$—$H_2O$ systems, $LiBr$—$H_2O$ cycles are applicable for cooling, but cannot be used for heat pump applications.

An absorption heat pump transfers low grade (low temperature) heat and 'pumps' it up to a higher, more useful temperature, using a higher grade energy source (combustion, solar, or waste heat for example). The resulting cycle coefficient of performance (COP) is greater than 1.0 (typically 1.5 to 2.0) depending upon the cycle and temperatures involved. In a domestic water heating application, the low grade heat energy source can be indoor or outdoor ambient air (although other sources such as geothermal can also be used), and water is heated from typical ground temperatures (approximately 50° F.) to 100 to 160° F.

Electrically driven heat pump water heaters are commercially available; which have a COP of approximately 2.0. However, on a primary fuel basis, the COP is actually about 0.7, since electrical power is typically produced at an approximate 35% efficiency. The proposed invention provides significantly higher primary fuel COP of approximately 1.5, cutting $CO_2$ emissions in half compared to electric heat pump water heaters. Commercially available conventional gas-fired water heaters have primary fuel COP ranging from about 0.6 to about 0.82.

One historical problem with absorption equipment, which requires many heat exchangers and at least one pump, is high manufacturing cost. Therefore, the need exists for an economically feasible absorption heat pump system.

BRIEF SUMMARY OF THE INVENTION

A small capacity, heat energy driven absorption heat pump (preferably 1 to 8 kW total heating output) is combined with a water storage tank (preferably 40 to 200 gallons) to provide hot water at temperatures of at least 100° F. for domestic uses and reduce $CO_2$ emissions by about 45% to about 60% compared to conventional gas-fired water heaters. The absorption system may be driven by combustion (typically natural gas or propane), thermal solar energy, or waste heat energy sources. The absorption system may be mounted directly on the storage tank (above, below or aside), or remote from the storage tank (such as outdoors). The absorption heat pump upgrades the temperature of a low temperature source (typically indoor or outdoor ambient air, or geothermal) to a temperature high enough to heat water to a temperature of at least 100° F.

When driven by combustion, flue gases exiting the absorption cycle are further cooled by the water to be heated to provide high efficiency combustion efficiencies (condensing). This additional flue gas cooling may be accomplished in a flue gas to water, or flue gas to hydronic working fluid, heat exchanger located inside or outside the storage tank. One possible arrangement is to pass the flue gas through the central flue tube of a conventional gas fired water heater. The inside of the flue tube should be protected from corrosion using either a protective coating (such as glass enamel) or by using a tube made from corrosion-resistant material.

When the low grade heat source is indoor ambient air, the absorption heat pump water heater provides additional advantages of cooling and dehumidifying the indoor air. Indoor air may be drawn from the space surrounding the heat pump water heater, or from another indoor location using ducts or a remote hydronic-air heat exchanger and a pump. One possible remote indoor location is the attic. The cooled and perhaps dehumidified air may be returned to the indoor space (summer mode) or exhausted outside the building (winter mode).

The absorption heat pump cycle may utilize any of the applicable refrigerant-absorbent working fluids, such as $NH_3$—$H_2O$. The absorption cycle may employ simple single effect cycles, or more complicated double, triple or combinations thereof, cycles. One such combination cycle often used for $NH_3$—$H_2O$ cycles is GAX (Generator Absorber Heat Exchange).

The absorption heat pump system may utilize any of a wide variety of suitable heat exchanger types, including shell and tube, brazed or welded plate, fin-tube coils, micro-channel and others. Heat energy may be transferred to the water in the storage tank from the heat pump (condenser and absorber heat) in many of several ways, including direct (refrigerant to water) or indirect (hydronic working fluid to water using hydronic pumps). In either of these cases, the heat exchanger may be located inside or outside the storage tank.

In order to increase the heating capacity of the system during times of high use, a second water heating source may be integrated into the absorption heat pump water heater. The second heat source may be an electric heating element, a second conventional combustion system or thermal energy from a solar panel.

By tying an absorption heat pump system to a water storage tank, a small, low capacity heat pump system can be used, minimizing manufacturing cost. Hot water stored in the tank acts as a thermal battery, providing a large quantity of thermal energy when needed on an intermittent basis, while the heat pump works to slowly reheat (re-charge) the water in the storage tank.

Figure 1:
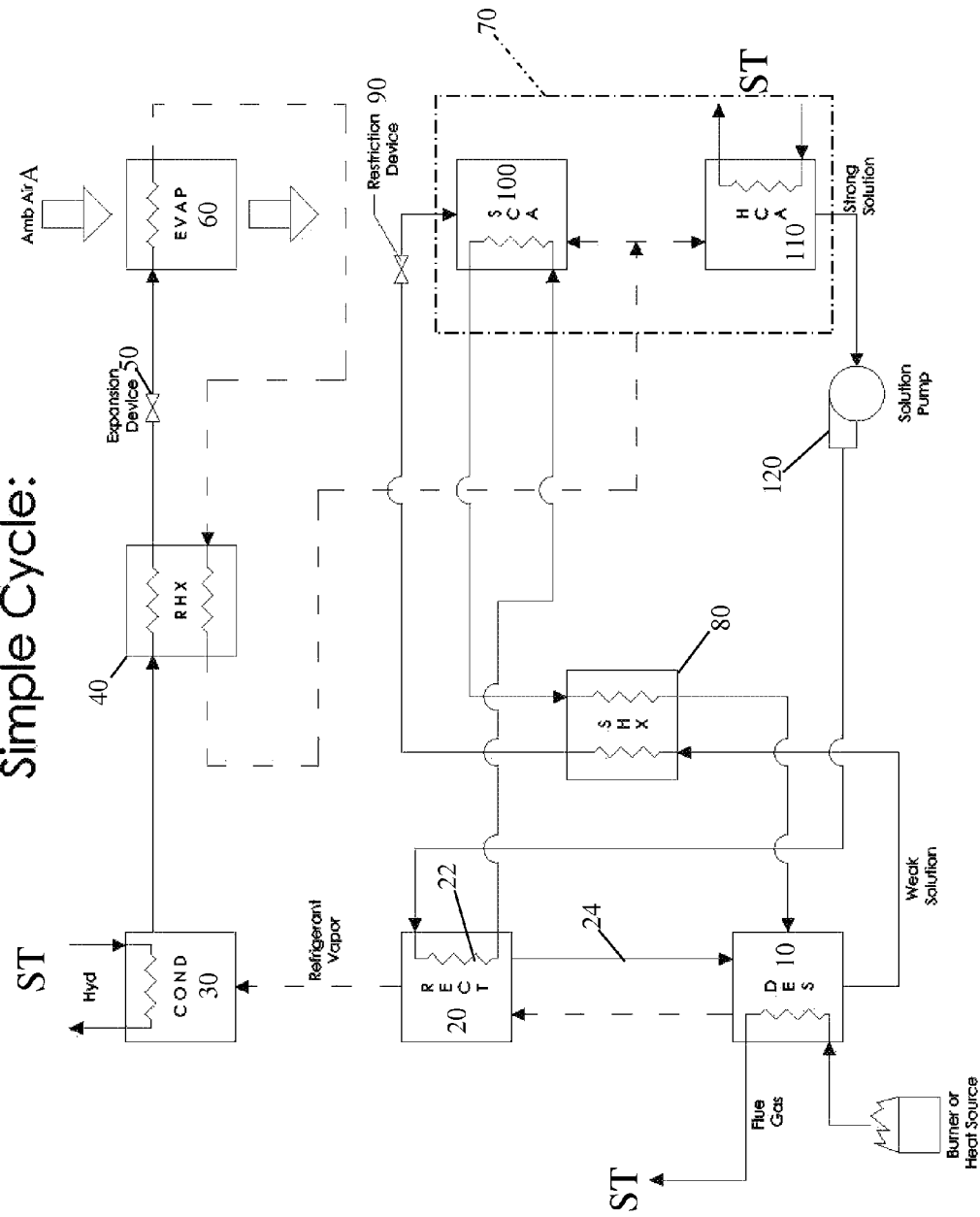
FIG. 1 is a schematic illustration of a preferred absorption heat pump apparatus used with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

U.S. Provisional Application Ser. No. 61/176,526 filed May 8, 2009 is incorporated into this application by reference.

FIG. 1 is a schematic illustration of a simple, single effect absorption heat pump apparatus showing the cycle of the working fluids. The vapor phase of the working fluid is shown in broken lines and the liquid phase fluid is shown in solid lines. This is not intended to be limiting but rather to be illustrative. For the purposes of the description that follows, the cycle associated with the FIG. 1 illustration is a gas-fired $NH_3$—$H_2O$ cycle. A person having ordinary skill in the art is aware that other refrigerant-absorbent combinations are available, as are other heat sources. For example, it is known that any suitable source of heat can be used, including but not limited to combustible fuels such as natural gas, propane, oil, kerosene, wood and equivalents. Other sources of thermal energy include electrical resistance heat, solar heat, waste heat from a high temperature process, waste heat from an engine or fuel cell or the warm region of another machine, such as a heat exchanger of a refrigerator. It is also known that various working fluids can be used, including but not limited to, ammonia and water, ammonia and an ionic fluid, water and lithium bromide, or carbon dioxide and an ionic fluid. Therefore, it will be apparent that, with modifications known to the person having ordinary skill, the embodiment of FIG. 1 can be adapted for use with other known heat sources and/or refrigerant types.

A high temperature heat source such as a combustion burner is shown providing heat energy to the Generator/Desorber (DES) 10. This causes refrigerant ($NH_3$) to vaporize out of $NH_3$—$H_2O$ solution present in the Generator/Desorber (DES) 10 at high pressure, typically about 200-300 psia. The $NH_3$ vapor exits the Generator/Desorber and the small amount of water vapor present in the $NH_3$ vapor stream is removed by condensation in the Rectifier 20 and returned to the Generator/Desorber (DES) 10 via the conduit 24. The $NH_3$ vapor transfers heat to the relatively cooler heat exchanger surfaces 22 in the Rectifier 20, and thereby to the fluid inside the heat exchanger.

Heat is removed from the purified $NH_3$ vapor in the Condenser 30, causing it to condense into a liquid. The heat collected from the condensing $NH_3$ vapor is used to heat the water in the storage tank (the storage tank is given reference characters "ST" in FIG. 1) either directly or indirectly. Direct heating occurs when the water in the storage tank is heated, such as by a heat exchanger, directly by the refrigerant passing through the Condenser 30. In an indirect system, a hydronic loop of working fluid receives heat from the refrigerant in the Condenser 30, then transfers the heat to the water of the storage tank. Optionally, after the flue gas in the combustion Generator/Desorber 10 passes from the Generator/Desorber 10, some thermal energy in the flue gas is then conveyed to the storage tank ST. Of course, if another heating source is used that has no flue gas, such as solar heating, this feature can be utilized by transferring thermal energy to the storage tank ST after the medium used in this other heating source has transferred some of the available thermal energy to the Generator/Desorber. This further transfer of thermal energy from the flue gas after heat is transferred to the Generator/Desorber increases efficiency.

The liquid $NH_3$ is cooled further in the Refrigerant Heat Exchanger (RHX) 40 and then reduced to low pressure (in a range from about 10 to about 100 psia) by a restriction device, such as a valve 50 that restricts the flow of fluids. The low pressure liquid $NH_3$ is then evaporated by absorbing heat from the relatively warmer low grade energy source in the Evaporator (EVAP) 60, which thereby cools the low grade heat source, such as ambient air. The evaporated $NH_3$ is heated in the RHX 40 and then travels to the Absorber system 70. The Absorber system 70 has a portion that is optional, and, when present, is normally combined with the other portions of the system 70 into a single unit. The optional portion is discussed below.

In the embodiment of FIG. 1, the low grade energy source in the Evaporator 60 is ambient air, shown with reference character "A" in FIG. 1. The term "ambient air" is defined herein as air that is available around the evaporator to be pulled, blown or moved by natural forces, such as gravity, or by an impeller across an active surface of the evaporator, such as a heat exchanger surface that transfers thermal energy to and/or from the evaporator. Typically, "ambient air" is air surrounding the evaporator and the heat pump, such as indoor air (or outdoor air for some embodiments).

Turning attention back to the Generator/Desorber (DES) 10, hot, high pressure $NH_3$—$H_2O$ solution with a low concentration of $NH_3$ (often called "weak" solution) exits the Generator/Desorber 10 and is cooled in the Solution Heat Exchanger (SHX) 80. The cooled weak solution is reduced to lower pressure and temperature using a restriction device 90 before entering the Absorber system 70.

In the Absorber system 70, the NH$_3$ vapor is absorbed back into the weak NH$_3$—H$_2$O solution. This is an exothermic process, and the heat of absorption must be continually removed so that the absorption process continues to occur. Depending upon the cycle, the heat of absorption optionally may be partially recovered into the cycle using a Solution Cooled Absorber (SCA) 100. The SCA 100 allows heat to flow from the weak solution to the strong solution just prior to entering Generator/Desorber (DES) 10. Thus, in higher efficiency cycles that use the SCA 100 option, the heat of absorption is used to vaporize some NH$_3$ prior to entering the Generator/Desorber (DES) 10. The remaining heat of absorption that cannot be internally recovered is rejected in the Low Temperature or Hydronically Cooled Absorber (HCA) 110, which is used to heat the water in the storage tank ST either directly (refrigerant to water) or indirectly (refrigerant to hydronic working fluid to water).

The cooled, high NH$_3$ concentration solution (often called "strong" solution) exiting the HCA 110 is pumped back to high pressure by the pump 120, passes through the Rectifier 20 coil to cool and purify the NH$_3$ vapor leaving the Generator, and is thereby pre-heated in the SHX 80, and optionally the SCA 100, before entering the Generator/Desorber (DES) 10 to start the cycle over.

Solar or waste heat can also be used to provide heat to the Generator/Desorber (DES) 10. The SHX 80 function is often integrated into the Generator/Desorber (DES) 10. The Condenser 30 and HCA 110 components may be internal to the water storage tank ST to directly heat the water, external to the tank (such as a coil wrapped around the outside of the tank), or external to the tank ST using a pumped hydronic working fluid (such as a conventional water/glycol mixture) which then heats the water in the storage tank ST using internal or external heat exchangers. If a pumped hydronic working fluid is used, the fluid may flow through the Condenser 30 and Absorber 70 in series or parallel.

The Evaporator 60 component may utilize a direct refrigerant to air fin-tube coil heat exchanger, or an indirect refrigerant to hydronic working fluid heat exchanger. One advantage of the indirect method is a possible reduction in total refrigerant charge.

Figure 2A:
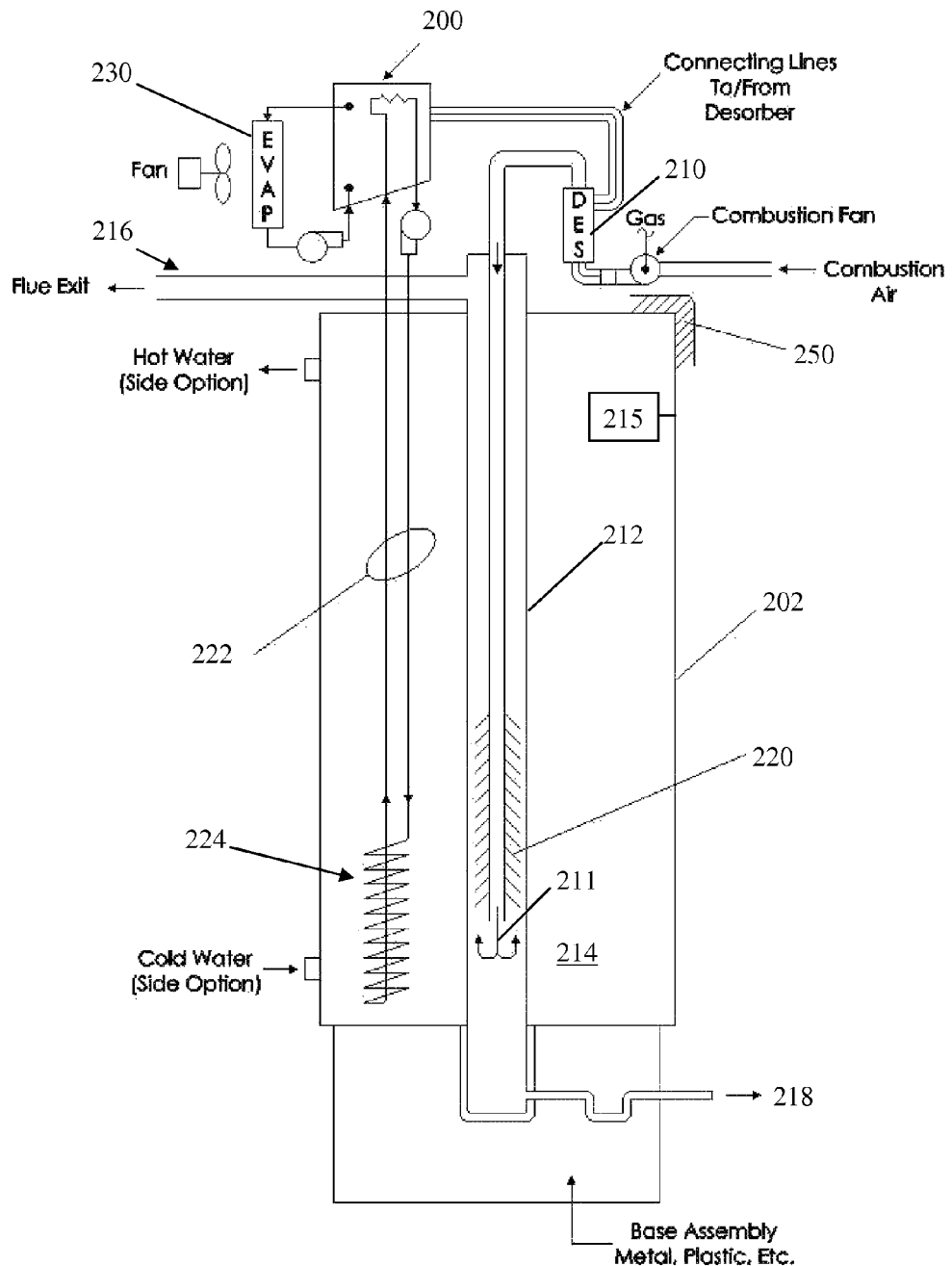
FIG. 2A is a schematic sectional view illustrating an embodiment of the present invention in which a heat pump apparatus is operatively connected to a water tank.

One contemplated arrangement of the invention, which can be the heat pump of FIG. 1 combined with a water storage tank, is shown in FIG. 2A. The heat pump unit 200 is shown without detail, installed resting on top of a conventional gas-fired storage water heater 202. A pre-mix combustion system provides heat to the heat pump cycle in the Desorber 210. Flue gas 211 exiting the generator 210 is typically at about 300-500° F. for a simple NH$_3$—H$_2$O cycle and travels to the bottom of a flue tube 212, which is similar to the flue tube of a conventional gas water heater. At the bottom of the flue tube 212, the flue gas 211 reverses direction and flows up the central, coaxial vent of the flue tube 212, transferring its thermal energy to the water 214 inside the tank. The cooled flue gas, which is preferably but not necessarily below its condensation temperature, exits the top of the flue tube 212 and is pushed outside through a suitable vent system 216. Condensate 218 formed inside the flue tube 212 travels to the bottom of the flue tube and is collected for disposal or allowed to evaporate into the ambient air. Alternatively, the flue gas could flow down the flue tube and exit below the tank, along with the condensate. In either case, a baffle 220 or other heat transfer enhancement means is preferably used to help transfer the heat of the flue gas to the water after the flue gas has heated the Generator/Desorber 210.

Heat from the Condenser and Absorber (reference numerals 30 and 110 in FIG. 1) is shown in FIG. 2A being collected by a pumped hydronic working fluid loop 222, with the Condenser and Absorber connected in series. Of course, the Condenser and Absorber can be connected in parallel with the resulting advantages and disadvantages of such a connection. The hydronic fluid transfers heat to the water in the storage tank via a heat exchanger coil 224 inserted inside the tank 202. Alternatively, the hydronic coil could be wrapped around the outside of the tank (see FIG. 3), or a pump could be used to pump water from the tank directly into the Condenser and Absorber components. One advantage of using a hydronic loop in which the working fluid is non-toxic is that double walled heat exchangers are not required. In order to increase the heating capacity of the FIG. 2A and FIG. 2B systems during times of high use, a second water heating source 215, 215' may be integrated into the absorption heat pump water heater. The second heat source 215, 215' may be an electric heating element, a second conventional combustion system or thermal energy from a solar panel.

Low grade heat from the ambient air is shown being collected in an Evaporator coil 230 using a pumped hydronic loop between the coil 230 and the heat pump sealed system 200. Alternatively, the refrigerant may flow directly through the Evaporator coil 230, negating the need for the pumped hydronic loop.

Cold water enters into the tank and hot water exits the tank through a water inlet and a water outlet shown on the side of the storage tank. Alternatively, the connections may be on the top of the tank, or a combination of both. In a preferred embodiment, hot water is removed from the tank near the top, and cold water is added to the tank near the bottom. Water that is removed to be heated by the condenser and absorber in accordance with the present invention is preferably removed near the bottom of the tank and returned to the tank near the top.

The tank is insulated with foam insulation 250 trapped between the tank and an outer jacket. Typically, the foam is 1-3 inches thick, but this can vary according to principals of engineering compromise. The storage tank can be made of a variety of materials including, but not limited to, steel, stainless steel, fiberglass and plastic. If the tank is made of steel, a protective coating on the inside of the tank and on the outside of the flue tube (such as glass enamel) is preferred to reduce corrosion. The inside of the flue tube, if made from carbon steel, should also be coated to protect it from the corrosive action of flue condensate. It is preferred that the flue tube 212 be made of metal, plastic or other equivalent material known to provide the necessary characteristics of thermal conductivity and corrosion resistance. Stainless steel is also contemplated, as is enamel-coated steel. Other protective coatings and corrosion-resistance means can be employed to provide the necessary combination of features.

Figure 2B:
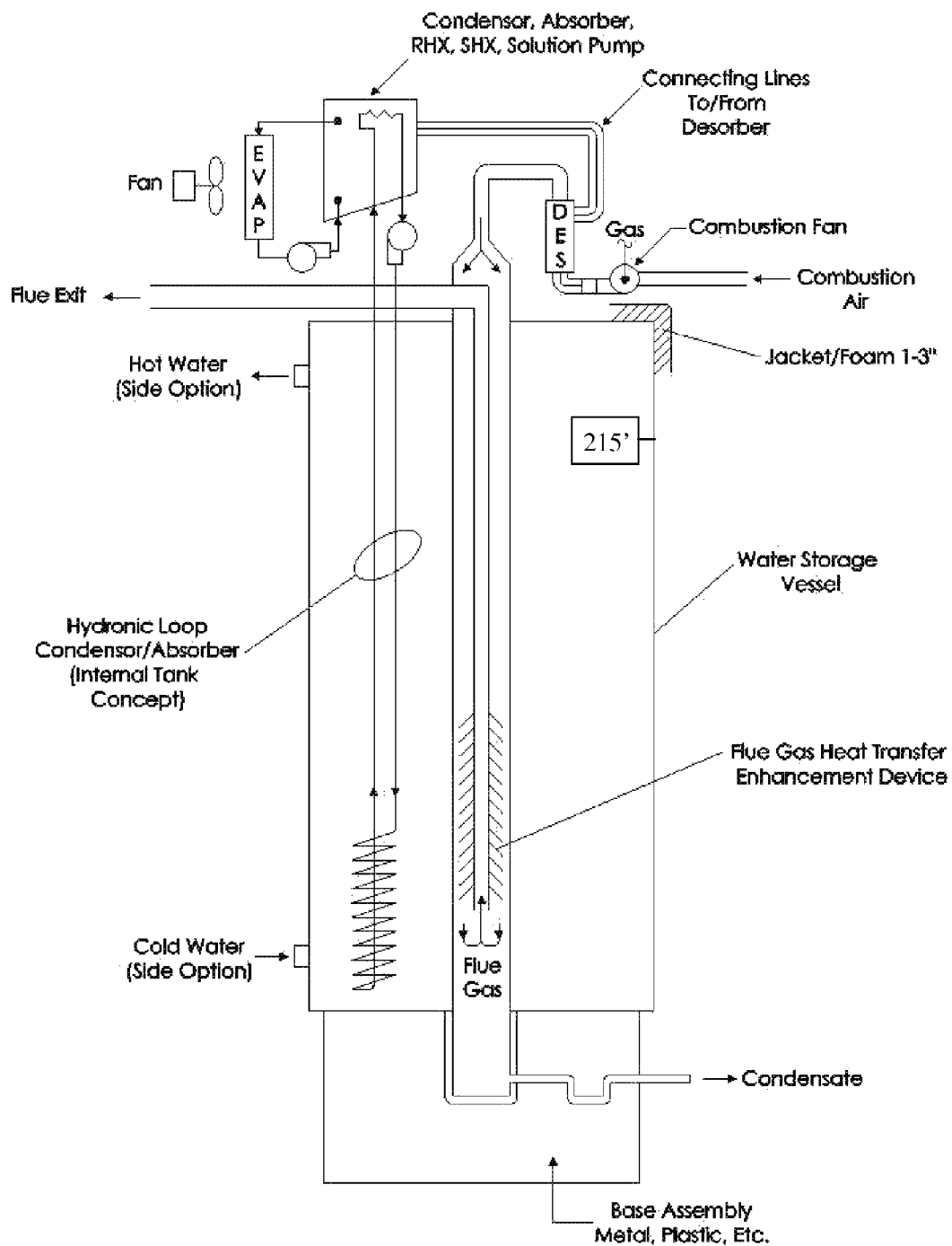
FIG. 2B is a schematic sectional view illustrating an alternative embodiment of the present invention that differs from the embodiment of FIG. 2A by the direction of flue gas flowing through the water heater, and the apparatus changes necessary to encourage this direction of flow.

The embodiment of FIG. 2B is similar to that of FIG. 2A, except that the vent structure is modified to reverse the direction of flow of the flue gas from the FIG. 2A embodiment. Thus, the flue gas in FIG. 2B is shown flowing first downwardly around the flue exit apparatus and fins, thereby giving up some thermal energy to the fins and the water surrounding the flue pipe. The flue gas then flows upwardly through the flue gas apparatus and exits the water heater, thereby transferring substantial amounts of thermal energy to the water and surrounding structures.

Figure 3:
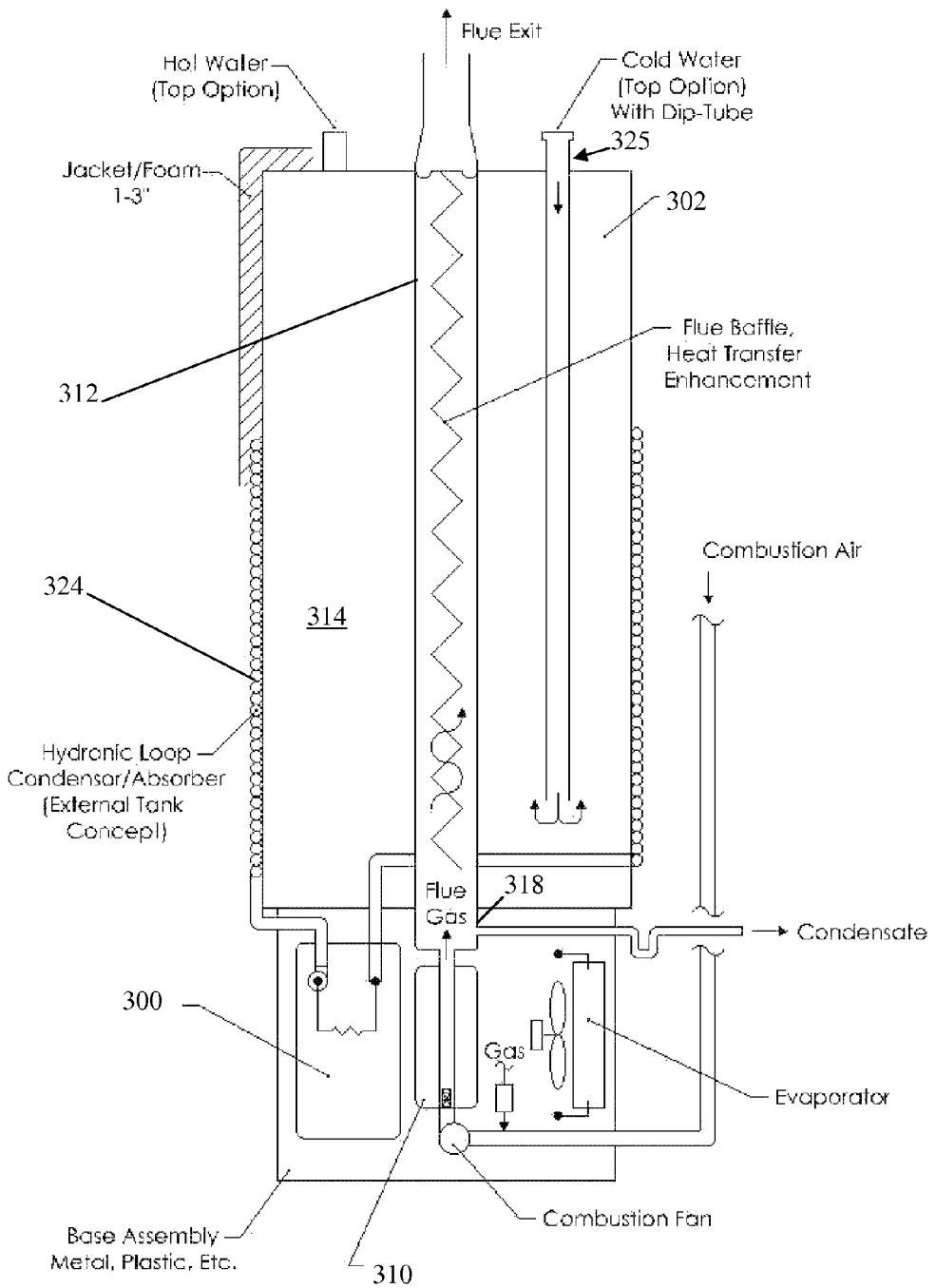
FIG. 3 is a schematic sectional view illustrating an alternative embodiment of the present invention.

Another contemplated arrangement of the proposed invention is shown in FIG. 3. In this arrangement, the heat pump system 300 is installed below a standard gas water heater storage tank 302. The Desorber 310 is located under the tank flue tube 312, which allows the flue gas exiting the Desorber 310 to flow up the tank flue tube 312, further cooling the flue gas, preferably, but not necessarily, below its condensation temperature. A condensation collection means 318 is shown between the Desorber 310 and the bottom of the flue tube 312.

In one contemplated embodiment of the invention, a heat pump system is installed beneath the storage tank and uses an atmospheric combustion system without a blower or fan. In this embodiment, the flue gases flow through the desorber and the vertical flue tube in the tank by the buoyancy of the hot flue gas (gravity flow). The embodiment of the invention that uses the atmospheric combustion is very similar in structure to the embodiment of FIG. 3. The desorber is mounted at the bottom of the storage tank or inside the flue tube near the bottom of the storage tank, there is a flue vent extending upwardly from the desorber to the ventilation system, and there is below the desorber an air inlet for cooler air to flow in.

FIG. 3 shows the Condenser and Absorber heat being transferred to the water 314 using a coil wrapped externally around the storage tank 312. A pumped hydronic working fluid flows inside the coil 324 and through the Condenser and Absorber components (reference numbers 30 and 110 of FIG. 1). Previously described choices for transferring this heat to the water also apply. The FIG. 3 embodiment also shows the use of flue gas entering the lower portion of the flue gas chimney and exiting the upper portion.

A pre-mix combustion system is shown in FIG. 3. Alternatively, the combustion blower could be mounted on top of the storage tank to pull the flue gas through the Desorber and flue tube. This arrangement also permits the use of a negative draft, atmospheric combustion system which permits the use of conventional, non-sealed vent systems that are commonly called 'Type B'. It should be noted that such an atmospheric combustion system limits the combustion efficiency to the maximum that could be obtained without condensation.

FIG. 3 also shows the alternate water inlet and outlet arrangement at the top of the tank where a dip tube 325 conveys the cold inlet water directly to the bottom of the tank. This serves as a possible alternative to the side-mounted inlet and outlet of the FIGS. 2A and 2B embodiments. The top water inlet and outlet is conventional on household water tanks in the United States.

It is contemplated that the arrangement of FIG. 3 can have an outer jacket that houses the entire apparatus and vents to the flue exit. This thereby provides a system in which, in the event of a refrigerant leak in the heat pump system, the refrigerant could only flow up the flue tube and exit the building via the flue gas vent system. This reduces the probability of a refrigerant leak creating a nuisance or hazard for the occupants of the building in which the apparatus is disposed.

Figure 4:
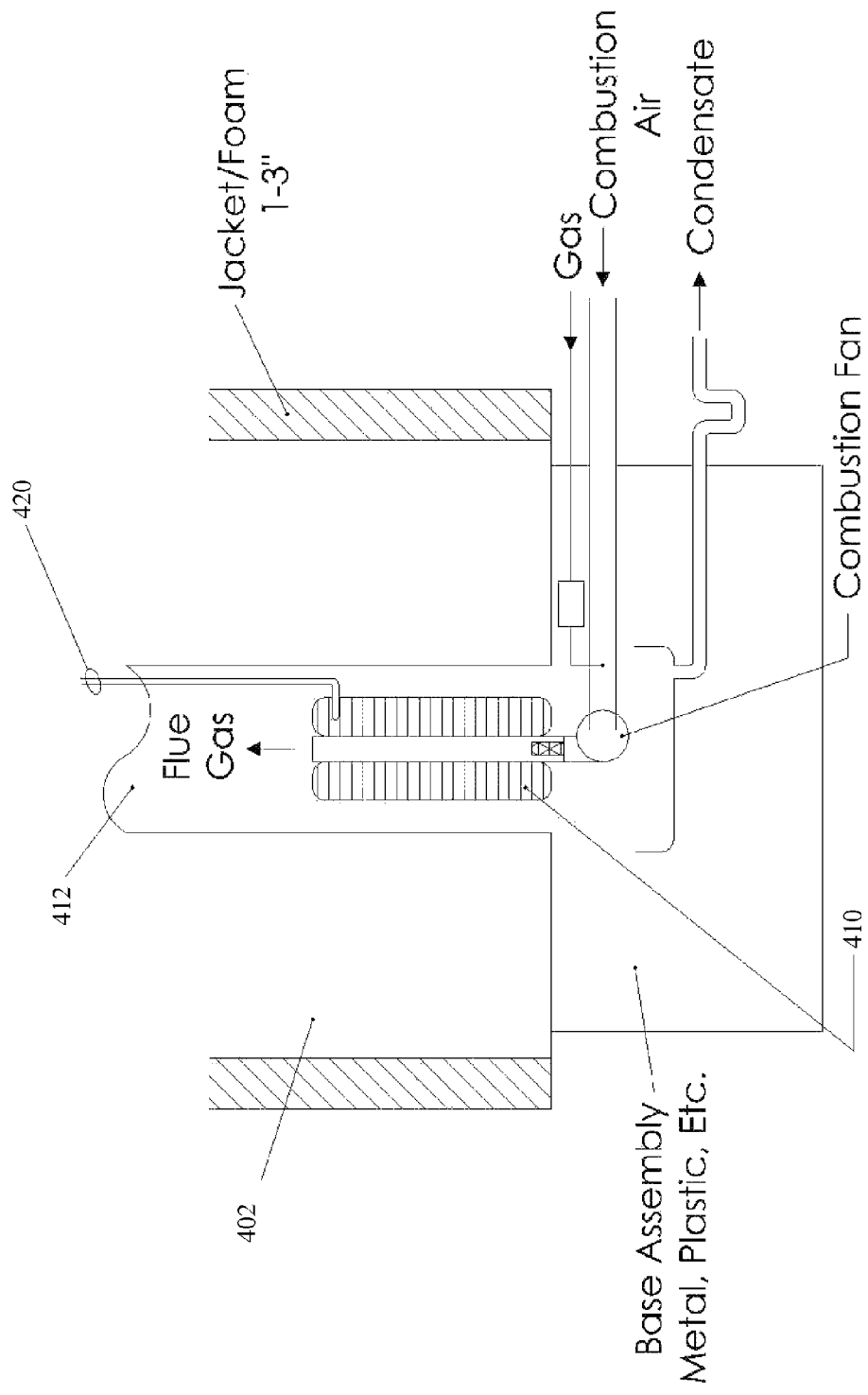
FIG. 4 is a schematic sectional view illustrating an alternative embodiment of the present invention.

FIG. 4 shows another possible arrangement where the Desorber 410 component is located inside the water storage tank 402 flue tube 412, near the bottom of the tank. The remainder of the heat pump system components (not visible in FIG. 4) are mounted on the top of the storage tank, although they could alternatively be beneath the tank. Lines 420 connecting the heat pump cycle fluids from the Desorber 410 to the rest of the heat pump system flow in tubes located inside the flue tube 412. A pre-mix combustion system with condensate collection means is also shown. This arrangement could provide lower heat losses from the Generator 410 and a reduced overall system footprint.

Figure 5:
FIG. 5 is a schematic diagram showing the flue gas flow paths in various contemplated embodiments.
Figure 5:
Figure 5:
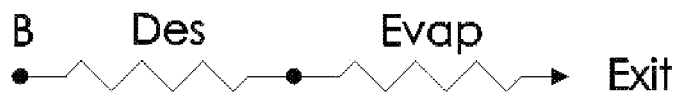
Figure 5:

FIG. 5 shows possible flue gas flow path arrangements. Each flow path starts at the Burner (B). In the first arrangement, the flue gas transfers heat to the Desorber and then to the water before exiting. In the second arrangement, the flue gas transfers heat to the Desorber, then to the water in the storage tank, and then to the Evaporator (reference number 60 in FIG. 1) before exiting. This arrangement could provide higher combustion efficiencies by reducing the flue gas temperature to approximately ambient temperatures and thereby returning the thermal energy back into the absorption cycle. This arrangement can also aid in providing defrosting of the evaporator when the evaporator is tied to very cold ambient air. In the third arrangement, the flue gas transfers heat to the Desorber and then the Evaporator before exiting. This arrangement provides a potentially simpler design in which more of the flue gas energy is captured by the heat pump cycle instead of being split between the heat pump and the water as in other embodiments, and aids in providing defrosting of the evaporator. In the fourth arrangement, heat from the flue gas is first transferred to the water, then to the Desorber and then finally to either the water or the Evaporator. Although the heat source is shown as a combustion heater that typically burns natural gas or propane to provide a heat source, the combustion burning heat source could be substituted by an equivalent heat source of any suitable type.

Figure 6A:
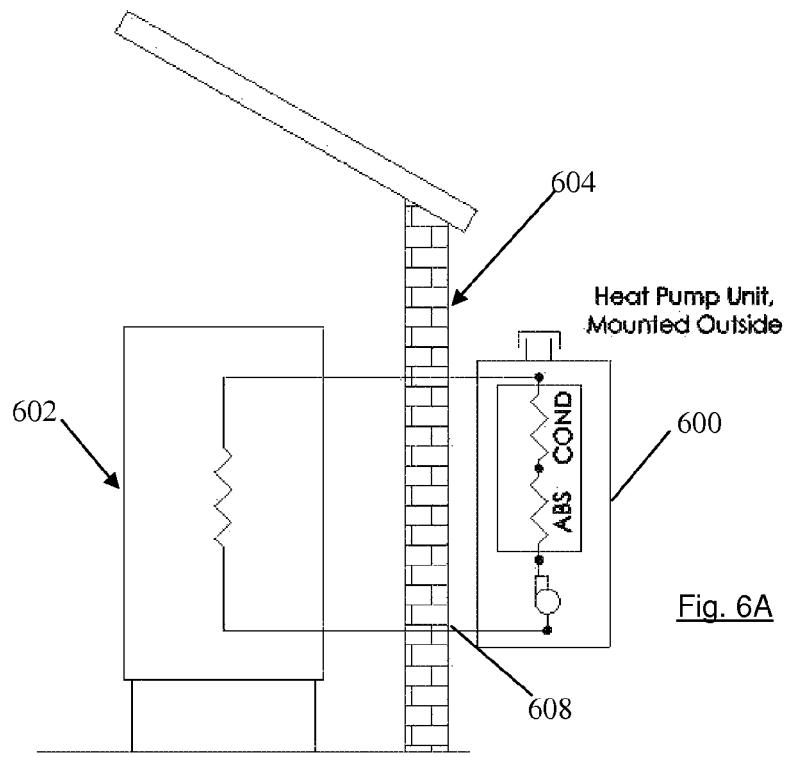
FIG. 6A is a schematic sectional view illustrating an embodiment of the present invention operatively mounted to a building.

FIG. 6A shows the heat pump system 600 mounted separately from the water storage tank 602, in this case outside the building envelope 604. A pumped hydronic loop 608 transfers heat from the heat pump 600 to the water storage tank 602. This arrangement permits the combustion to occur completely outside the building, eliminating the need for combustion air inlet and flue gas outlet vent systems that penetrate the building envelope. Also, since outdoor air is being used to heat the Evaporator (reference numeral 60 in FIG. 1), the cooled air remains outside the building, which is preferable during winter operation or in cold climates with short cooling seasons. Also, if refrigerant leaks from the heat pump system, it will not enter the occupied space (building envelope 604).

Figure 6B:
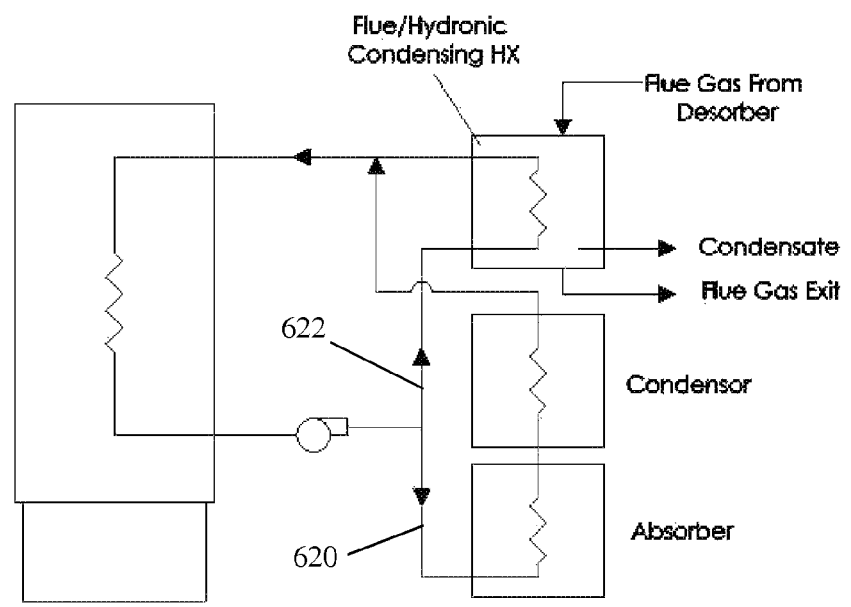
FIG. 6B is a schematic illustration of an absorption heat pump apparatus used with the embodiment of the present invention shown in FIG. 6A.

One possible shortcoming of the embodiment shown in FIG. 6A is that the flue gas cannot be cooled by the water in the storage tank once the flue gas has passed over the Desorber, which could result in lower efficiency than other embodiments described herein. FIG. 6B shows, schematically, an apparatus for achieve condensing combustion via the use of a flue gas-hydronic heat exchanger incorporated into the hydronic loop between the water storage tank and the Condenser/Absorber. A water line 620 of the hydronic loop from the storage tank extends to carry part of the water to the Condenser-Absorber so that heat from the Condenser-Absorber is transferred to water flowing therethrough as described herein. Furthermore, a water line 622 of the hydronic loop from the storage tank extends to carry part of the water to a water-flue gas heat exchanger to further cool the flue gas exiting the Desorber and further transfer thermal energy to the water. The two water line flow paths recombine and convey the heated water back to the storage tank. This can be done directly with water pulled from the tank, or indirectly using a hydronic fluid, which is the embodiment shown in FIG. 6B.

Figure 7:
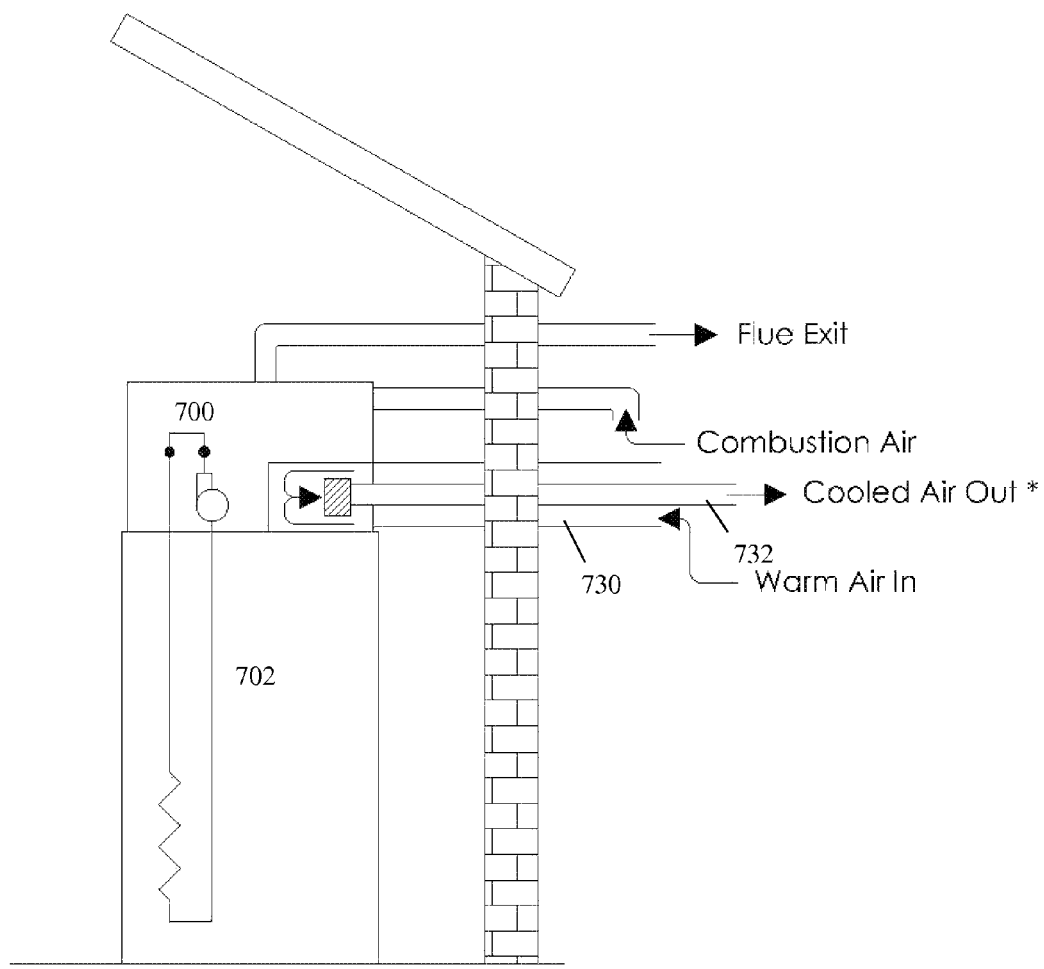
FIG. 7 is a schematic sectional view illustrating an alternative embodiment of the present invention operatively mounted in a building.

FIG. 7 shows a venting arrangement in which the heat pump 700 is installed as a single unit that is integral with and resting on the tank 702, and preferably enclosed within a cabinet or housing. All of the combustion air is drawn from outside the building envelope, and the flue gases are discharged outside via a vent system. The combustion air inlet and flue gas exit vents can be a "concentric" arrangement, as is shown for the cooled and warm air vents 730 and 732, in which the incoming combustion air flows inside a tube surrounded by, and coaxial with, a larger tube carrying the flue gas. In this arrangement, the flue gas exiting the heat pump water heater flows in the annulus formed between the two concentric ducts and combustion air is drawn from outside the building envelope to the combustion system inside the inner duct. This creates only one opening in the building envelope and provides advantageous combustion air pre-heating because the cool combustion air flows inside the inner duct and is heated by the warm flue gas flowing in the annulus space between the thermally conductive inner duct and the outer duct. Of course, the flow directions can be reversed, so that the cool combustion air could be in the annulus and the hot flue gas inside the inner tube, if so desired.

FIG. 7 shows the air for the Evaporator being drawn from outside through the duct 730, then rejected back outside via a concentric vent 732. A fan or blower preferably provides for the air movement through this system. Alternatively, the air inlet/outlet vent system need not be concentric, but instead two separate vents as shown for the combustion venting system.

Figure 8:
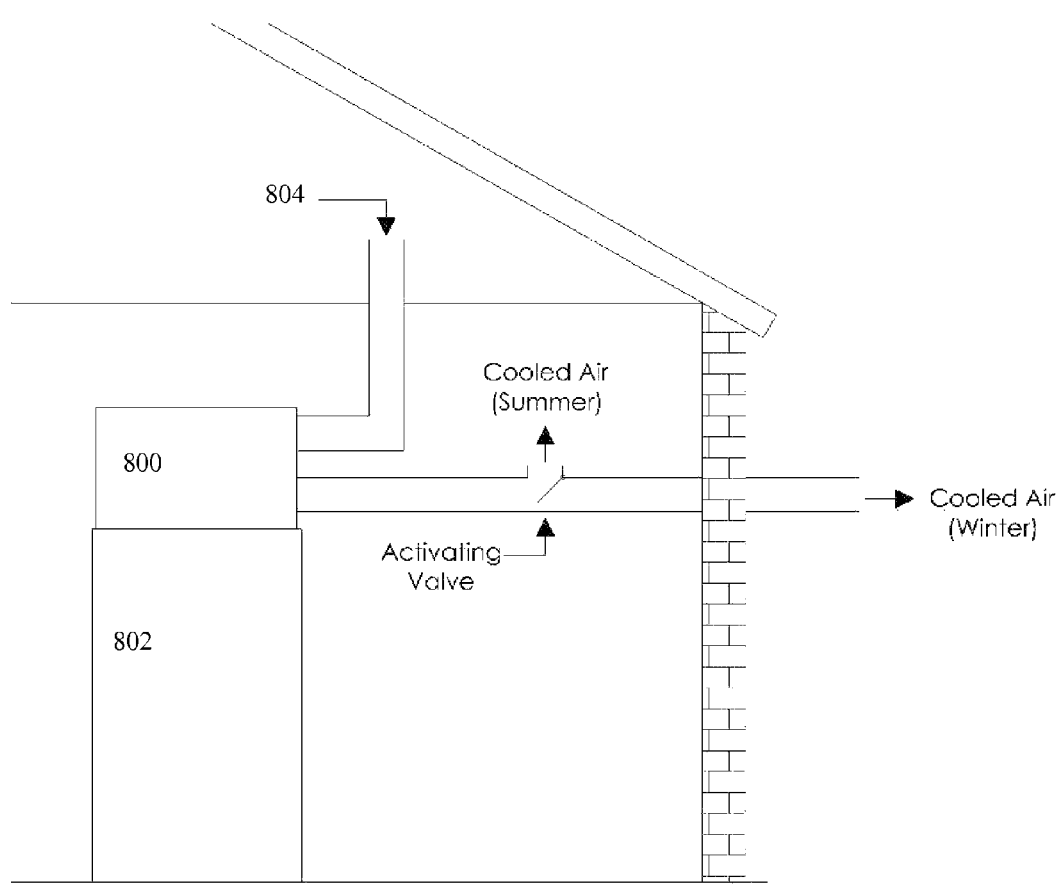
FIG. 8 is a schematic sectional view illustrating an alternative embodiment of the present invention operatively mounted to a building.

FIG. 8 shows the combination heat pump 800 and water heater 802 installed indoors, with the air for the Evaporator drawn from a remote interior location, in this case the attic 804. Attic air is often very warm, which provides appreciable thermal energy for increased Evaporator efficiency and improved attic ventilation. FIG. 8 also shows an automatic or manually switched valve to cause the cooled air to exit the building envelope or entering the interior living space, depending upon the season. In heating season, or when an automatic system detects the predetermined conditions, it is preferred to vent the cooled air outside. In cooling season, or when an automatic system detects the predetermined conditions, it is preferred to vent the cooled air inside to reduce the air conditioning load. Alternatively, the cooled air could be returned to the attic.

Figure 9:
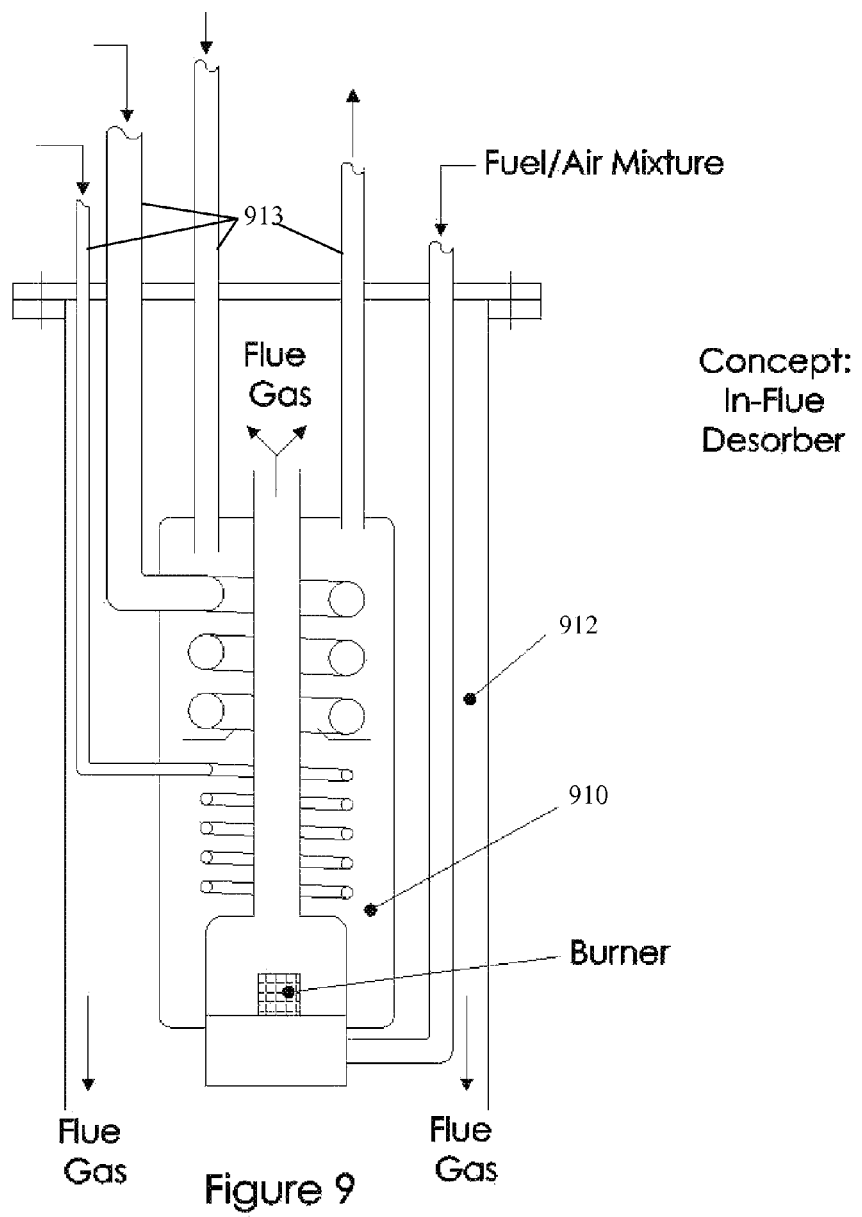
FIG. 9 is a schematic sectional view illustrating an alternative embodiment of the present invention.

FIG. 9 shows an alternative arrangement with the Desorber 910 located inside the storage tank flue tube 912 near the top of the tank. Connecting lines 913 permit the flow of solution and vapor to and from the Desorber 910 to the remainder of the heat pump system (not visible in FIG. 9). The flue gas exits the Desorber 910, turns and flows down the flue tube 912, exiting at or near the bottom of the tank. This arrangement may also reduce heat loss from the Desorber and thereby increase efficiency by transferring thermal energy to the water from the flue gas after the gas has given up substantial heat to the Desorber 910.

Figure 10:
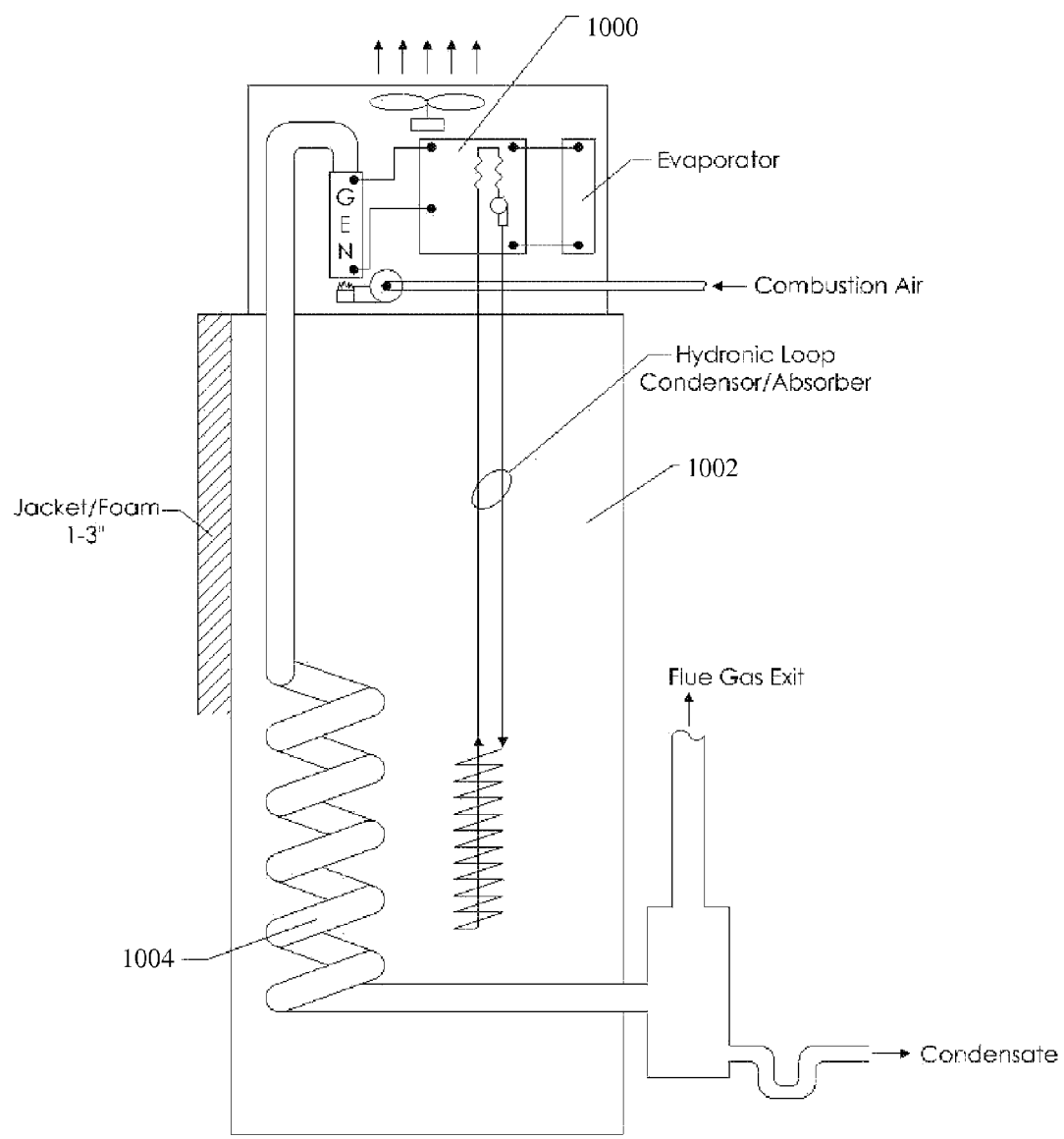
FIG. 10 is a schematic sectional view illustrating an alternative embodiment of the present invention.
Figure 11:
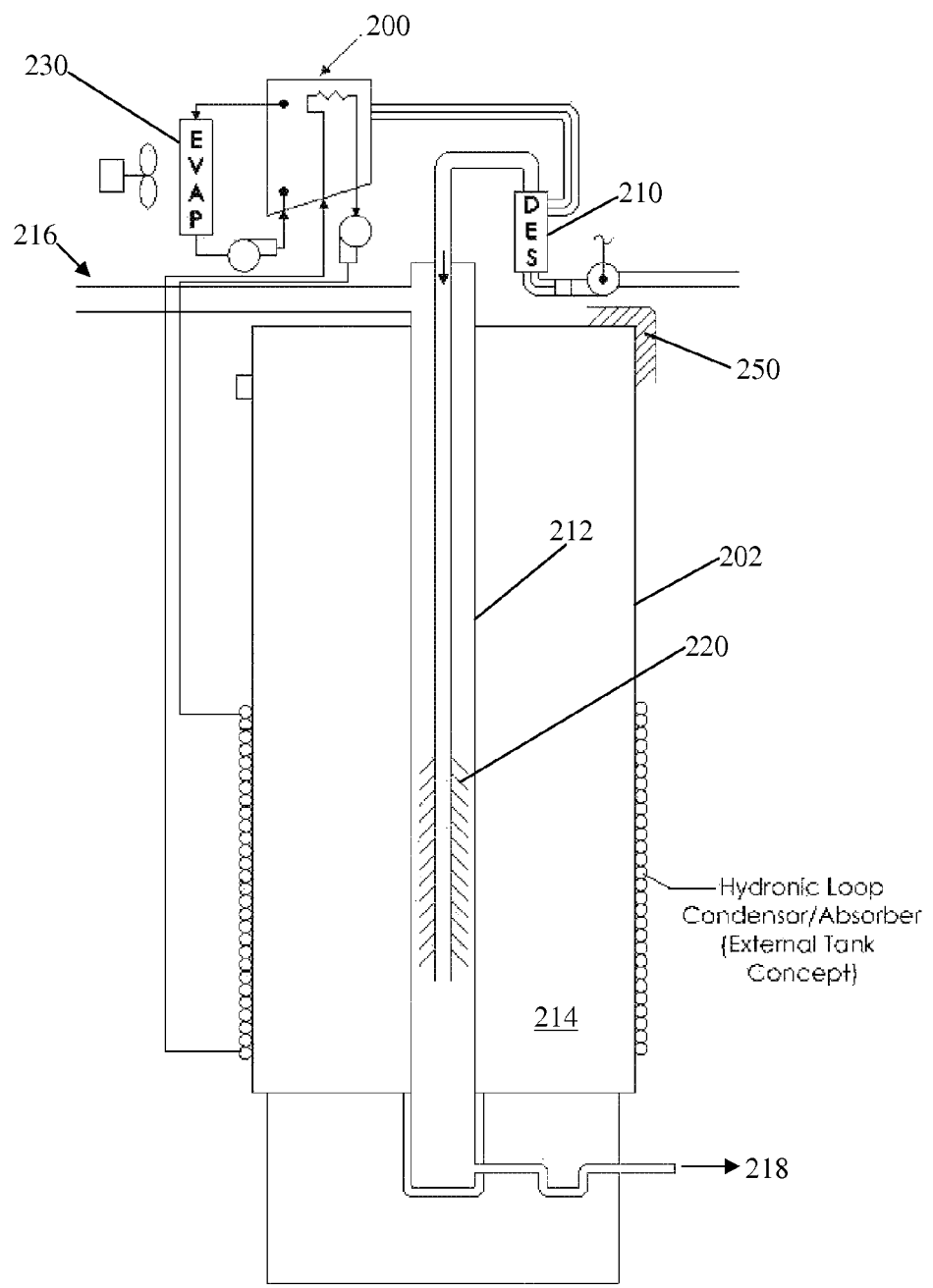
FIG. 11 is a schematic sectional view illustrating an embodiment of the present invention in which a heat pump apparatus is operatively connected to a water tank.

FIG. 10 shows the heat pump system 1000 installed on the top of a water storage tank 1002 that does not have a vertical flue tube. In this arrangement, a coil heat exchanger 1004 is installed inside the tank to transfer thermal energy to the water in the tank and, thereby, cool the flue gases leaving the generator, preferably but not necessarily, below the condensation temperature. Of course, a coil heat exchanger could be mounted on the outside of the storage tank sidewall, thereby conducting thermal energy to the water through the tank sidewall as in the embodiment of FIG. 3. The coil could be made from steel with a protective coating, stainless steel, or other suitable material as will be apparent to a person having ordinary skill. The condensate is then disposed of in a conventional manner.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A combination water storage vessel and thermally-activated, absorption cycle heat pump, the absorption cycle heat pump including at least a desorber warmed by combustion gas from a heat source, an absorber, an evaporator and a condenser connected by fluid conduits containing a working fluid, the water storage vessel including a water inlet and a water outlet and storing potable water for domestic use, the combination comprising:
   (a) means for transferring heat from the absorber and the condenser to the potable water in the storage vessel and thereby heating the potable water;
   (b) means for transferring heat to the evaporator from ambient air;
   (c) the absorption cycle heat pump and a combustion burner defining the heat source are mounted to the storage vessel above the potable water; and
   (d) a blower that forces warm combustion gas exiting the heat source through the desorber and then downwardly through a heat exchanger that is mounted in the storage vessel extending from near a lower end of the storage vessel to near an upper end of the storage vessel, the heat exchanger having a sidewall that at least partially defines an exit path of the warm combustion gas and defines a side of the vessel against which the potable water seats for transferring thermal energy from the warm combustion gas through the sidewall by conduction to the potable water.

2. The combination in accordance with claim 1, wherein the heat exchanger is a vertical tube mounted in the storage vessel and extending from the lower end of the storage vessel to the upper end of the storage vessel, the vertical tube having the sidewall that at least partially defines the exit path of the warm combustion gas and defines the side of the vessel against which the potable water seats for transferring thermal energy from the warm combustion gas through the sidewall to the potable water.

3. The combination in accordance with claim 1, wherein the heat exchanger is a conduit passing through the storage vessel that has the sidewall at least partially defining the exit path of the warm combustion gas that defines the side of the vessel against which the potable water seats for transferring thermal energy from the warm combustion gas through the sidewall to the potable water.

4. The combination in accordance with claim 1, further comprising a secondary heating element disposed in the storage vessel for operating when more heating of the water is required than is possible using the heat pump alone.

5. The combination in accordance with claim 4, wherein the heat pump, independent of the secondary heating element, transfers no more than about 8 kilowatts of energy to the water.

6. The combination in accordance with claim 1, wherein the means for transferring heat from the absorber and condenser is a hydronic loop that comprises a conduit that extends into an interior of the storage vessel, the potable water seating against the conduit for transferring thermal energy from a fluid in the conduit through a conduit sidewall to the potable water.

7. The combination in accordance with claim 1, wherein the means for transferring heat from the absorber and condenser is a hydronic loop that comprises a conduit that extends around an exterior sidewall of the storage vessel, the potable water seating against the exterior sidewall for transferring thermal energy from a fluid in the conduit through a conduit sidewall, through the exterior sidewall of the storage vessel to the potable water.

8. The combination in accordance with claim 1, wherein the warm combustion gas is a flue gas, and the flue gas is cooled in the heat exchanger to at least as low as a dew point temperature of the flue gas.

9. The combination in accordance with claim 1, further comprising a restriction device mounted in the fluid conduits to restrict a flow of working fluid.

10. A combination water storage vessel and thermally-activated, absorption cycle heat pump, the absorption cycle heat pump including at least a desorber warmed by combustion gas from a heat source, an absorber, an evaporator and a condenser connected by fluid conduits containing a working fluid, the water storage vessel including a water inlet and a water outlet and storing potable water for domestic use, the combination comprising:

(a) a fluid loop for transferring heat from the absorber and the condenser to the potable water in the storage vessel and thereby heating the water;

(b) a first heat exchanger for transferring heat to the working fluid from ambient air;

(c) the absorption cycle heat pump and a combustion burner defining the heat source are mounted to the storage vessel above the potable water; and (d) a blower that forces warm combustion gas exiting the heat source through the desorber and then downwardly through a second heat exchanger that is mounted in the storage vessel extending from near a lower end of the storage vessel to near an upper end of the storage vessel, the second heat exchanger having a sidewall that at least partially defines an exit path of the warm combustion gas and defines a side of the vessel against which the potable water seats for transferring thermal energy from the warm combustion gas through the sidewall to the potable water.

* * * * *